US005886810A

United States Patent [19]
Siahpoushan et al.

[11] Patent Number: 5,886,810
[45] Date of Patent: Mar. 23, 1999

[54] MOUNTING APPARATUS FOR AN OPTICAL ASSEMBLY OF A PHOTOELASTIC MODULATOR

[75] Inventors: Massoud M. Siahpoushan, Vancouver, Wash.; James A. Hinds, Scappoose; Richard R. Rockwell, Portland, both of Oreg.

[73] Assignee: Hinds Instruments, Inc., Hillsboro, Oreg.

[21] Appl. No.: 938,466

[22] Filed: Sep. 29, 1997

[51] Int. Cl.⁶ .................. G02F 1/11; G01J 4/00; G01N 21/21

[52] U.S. Cl. .......... 359/285; 359/286; 356/364; 356/365

[58] Field of Search ............ 359/285, 286, 359/287, 305; 356/364, 365, 366, 367; 248/560

[56] References Cited

U.S. PATENT DOCUMENTS

| | | | |
|---|---|---|---|
| 1,814,843 | 7/1931 | Narath | 359/245 |
| 1,845,551 | 6/1932 | Mitzl | 248/560 |
| 1,873,834 | 8/1932 | Fleckenstein | 248/581 |
| 2,100,836 | 11/1937 | Clothier | 359/245 |
| 3,115,323 | 12/1963 | Crandell | 248/20 |
| 3,582,920 | 6/1971 | Billawala | 248/560 |
| 3,824,000 | 7/1974 | Burns | 359/503 |
| 4,101,008 | 7/1978 | Frosch | 188/1 |
| 4,215,915 | 8/1980 | Freiberg | 353/81 |
| 4,466,295 | 8/1984 | Wesson | 356/33 |
| 4,519,252 | 5/1985 | McMahon | 73/655 |
| 5,177,555 | 1/1993 | Stratton et al. | 356/35.5 |
| 5,588,632 | 12/1996 | Solomon | 248/560 |
| 5,645,262 | 7/1997 | Hamlin | 248/581 |

FOREIGN PATENT DOCUMENTS

| | | | |
|---|---|---|---|
| 60-118822 | 6/1985 | Japan | 359/285 |
| 61-45232 | 3/1986 | Japan | 359/285 |
| 5-289031 | 11/1993 | Japan | 359/245 |
| 2038025 | 7/1980 | United Kingdom | 359/285 |

OTHER PUBLICATIONS

Hinds Instruments Drawings, 2–page drawing, Hinds Instruments Inc. USA, circa Jan. 1996.

*Primary Examiner*—Georgia Epps
*Assistant Examiner*—Margaret Burke
*Attorney, Agent, or Firm*—Hancock Meininger & Porter, LLP

[57] ABSTRACT

An optical assembly comprising an optical element and a transducer is suspended within an enclosure so that the optical assembly is free to vibrate within the enclosure. In one embodiment, the mechanisms for suspending the assembly do away with any elastomeric material that would cause outgassing in applications where the photoelastic modulator is used in a high vacuum environment. The suspension system also increases the efficiency of the system.

27 Claims, 3 Drawing Sheets

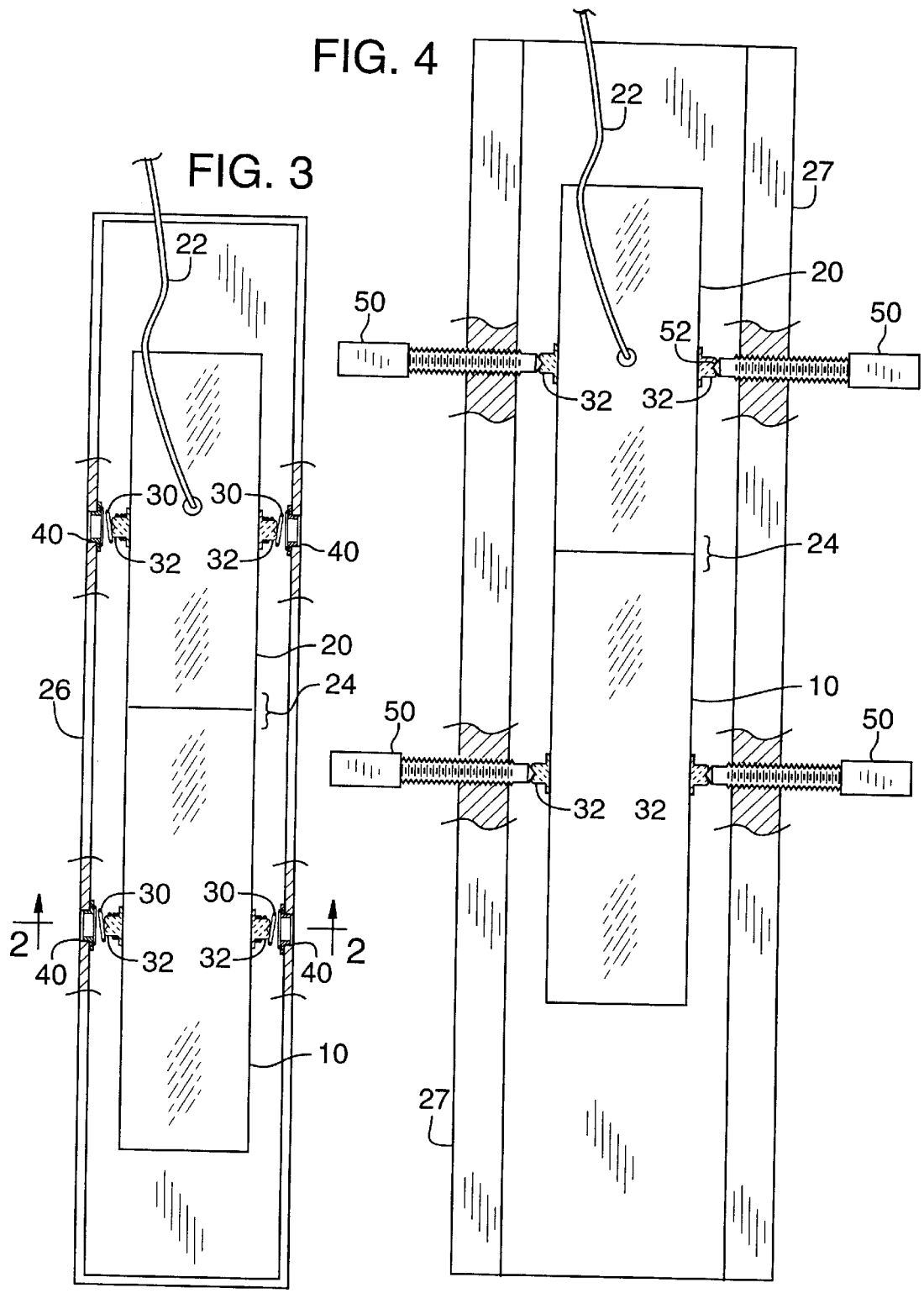

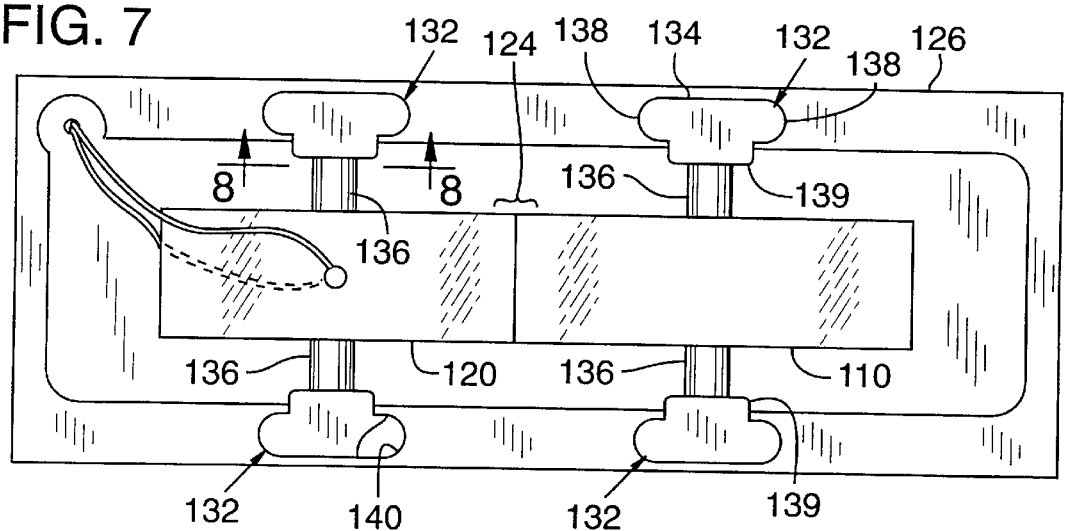
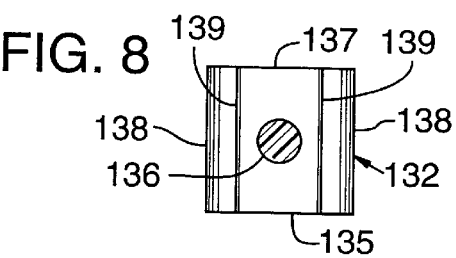
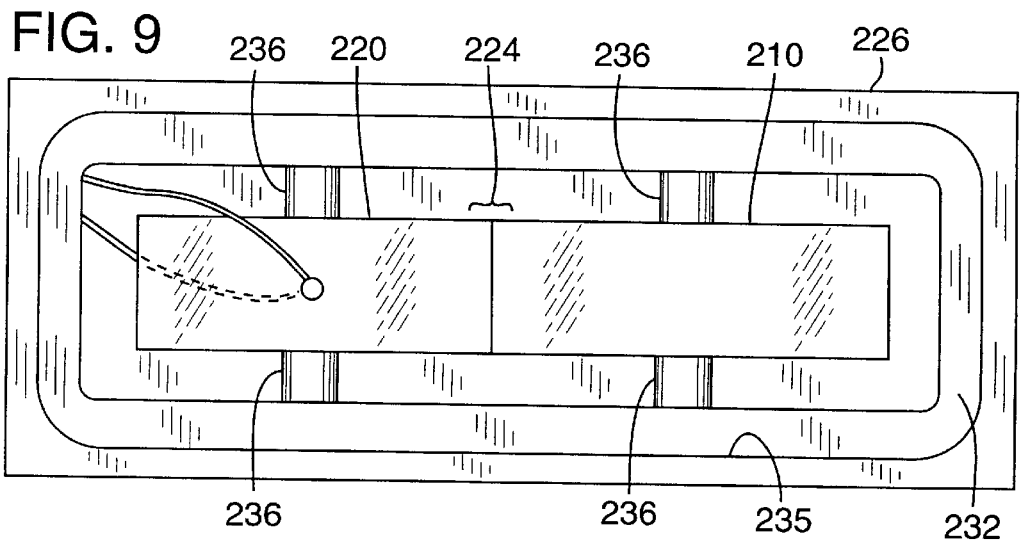

MOUNTING APPARATUS FOR AN OPTICAL ASSEMBLY OF A PHOTOELASTIC MODULATOR

FIELD OF THE INVENTION

The present invention relates to an apparatus and method for mounting an optical assembly of a photoelastic modulator, thereby to facilitate efficient vibration of the optical assembly. The invention is particuary adapted for modulators used in high temperatures, or in high or ultra high vacuum environments.

BACKGROUND AND SUMMARY OF THE INVENTION

A photoelastic modulator (PEM) is an instrument that is used for modulating the polarization of a beam of light. A PEM employs the photoelastic effect as a principle of operation. The term "photoelastic effect" means that an optical element that is mechanically stressed and strained (deformed) exhibits birefringence that is proportional to the amount of deformation induced into the element. Birefringence means that the refractive index of the element is different for different components of a beam of polarized light.

A PEM includes an optical element, such as fused silica, that has attached to it a transducer for vibrating the optical element at a fixed frequency within, for example, the low-frequency, ultrasound range of about 20 kHz to 100 kHz. The mass of the element is compressed and extended as a result of the vibration. The combination of the optical element and the attached transducer may be referred to as an optical assembly.

The compression and extension of the optical element imparts oscillating birefringence characteristics into the optical element. The frequency of this oscillating birefringence is determined by the length of the optical element and the speed of the transducer-generated longitudinal vibration or sound wave through the material that comprises the optical element.

The effect of the oscillating birefringence of the PEM on a linear-polarized monochromatic light wave is to vary over time the phase difference between the orthogonal components of the light that propagates through the optical element. This phase difference is known as retardation or retardance and can be measured in terms of length, waves (for example, quarter-wave, half-wave), or phase angle.

The accurate measure and control of retardation (by precise detection of the polarization of the PEM output light) has numerous practical applications. Certain applications may demand polarization measurement sensitivity levels on the order of $10^{-6}$.

The optical assembly is contained within a housing or enclosure that normally includes an aperture through which the light under study is directed through the optical element. The enclosure supports the optical assembly in a manner that permits the optical element to be driven (vibrated) within it to achieve the above noted photoelastic effect.

The optical assembly must be mounted to the enclosure in a way such that the mechanisms for mounting the optical assembly permit free vibration of the optical assembly without introducing any stress or strain on the optical element. Such stress or strain would result in undesirable changes in the birefringent characteristics of the optical element.

In the past, the optical assembly has been mounted within the enclosure with the use of elastomeric grommets or grommet-like members. The grommets were synthetic rubber, buna, or a silicon elastomer. The grommets were mounted to the enclosure on opposing sides of the optical assembly. Acrylic, cone-shaped supports were bonded to the optical assembly, and the grommets were located so that a cone-shaped support would protrude into the bore of the elastomeric grommet. Typically, the optical element was held between two opposing pairs of grommets. In other approaches, the grommets were supported on movable brackets. Once the optical assembly was in place (with the supports fit into the bore of the grommets), the brackets that hold the grommets were fastened to the enclosure.

The prior technique for mounting the optical assembly to the enclosure is generally effective but has at least two drawbacks.

One drawback is that the elastomeric grommets may not be used when the PEM is to be employed in a high or ultra high vacuum chamber as is sometimes required for certain applications. In such applications, the grommets tend to suffer from "outgassing" within the vacuum chamber, with the result that the desired vacuum level in the chamber may never be properly obtained, or undesirable contaminants are released from the grommets and interfere with expensive instrumentation and optics within the chamber. The grommets of the prior art could be formed of material that can withstand high temperature and high vacuum environments, but such material is costly.

Another drawback to the use of elastomeric grommets for supporting a vibrating optical assembly is the deleterious effects it has on the overall performance quality factor, or "Q" value, of the photoelastic modulator. In this regard, "Q" is defined as the ratio of the energy stored in a system to the energy lost per cycle. The higher the "Q," the more efficient the system. The elastomeric grommets tend to dampen the vibration of the optical element, thus requiring more drive energy to maintain the desired vibrational frequency of the element. Increasing drive energy increases the heat generated within the photoelastic modulator, which causes a reduction in the Q value.

The present invention is directed to an apparatus and method for mounting an optical assembly of a photoelastic modulator to a rigid enclosure. The technique is such that the problems associated with outgassing in a high vacuum environment are completely eliminated. Moreover, the "Q" value of the system employing the mounting techniques of the present invention will be greater than that of a system employing the elastomeric grommets described above.

In a preferred embodiment, the brackets and elastomeric grommets are eliminated in favor of an array of coiled springs that are attached between the optical element and the enclosure to suspend the optical element within the enclosure to facilitate its vibration. The springs are not subject to the outgassing problem of elastomeric members. The mounting technique is particularly suitable for modulators employed in high and ultra high vacuum environments. The springs are configured and arranged so that no stress or strain is induced into the optical element as a result of mounting the element with the springs.

In another embodiment of the present invention, the optical assembly is suspended between threaded members that are mounted to the enclosure and are extendable into contact with the optical assembly to support the optical assembly without deforming the optical element. In one version of this alternative embodiment, the tips of the threaded members engage posts that are mounted to the optical element. In another version, the tips of the threaded members engage correspondingly shaped recesses formed in the optical assembly.

There are other advantages of the present invention, which will become apparent upon reading the detailed description set forth below.

BRIEF DESCRIPTION OF THE DRAWINGS

FIG. 3 shows in top view the preferred mounting apparatus of the present invention.

FIG. 4 depicts an alternative mounting apparatus in accord with the present invention.

FIG. 7 is a top view of another alternative mounting apparatus in accordance with the present invention.

FIG. 8 is a cross sectional view, taken along line 8—8 of FIG. 7.

FIG. 9 is a top view of another alternative mounting apparatus in accordance with the present invention.

DETAILED DESCRIPTION OF PREFERRED EMBODIMENTS

Figure 1:
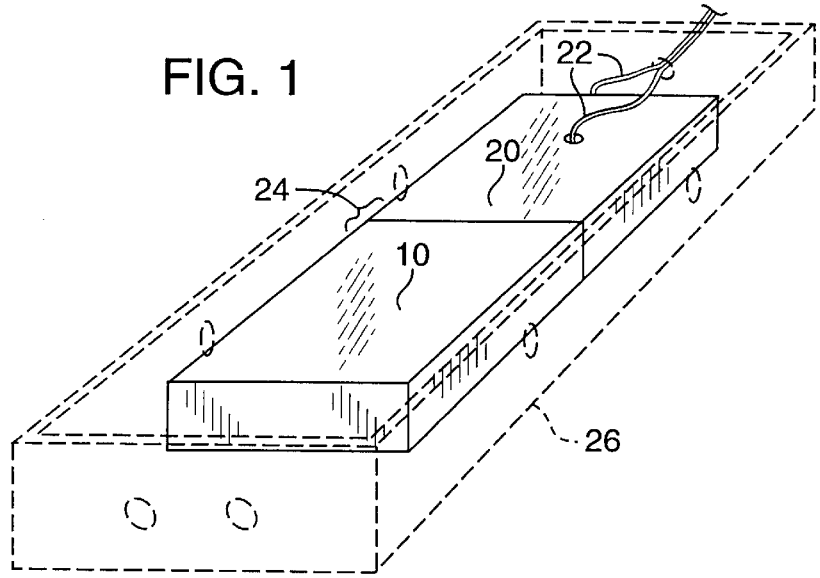
FIG. 1 is a perspective view of a photoelastic modulator, showing the optical assembly in solid lines, and an enclosure in dashed lines for illustrative purposes.

FIG. 1 depicts the primary components of a photoelastic modulator, including an optical element 10 formed of fused silica. Preferably, the optical element is etched to reduce stress birefringence, in accordance with the teachings of U.S. Pat. No. 3,864,111 to Kemp. Other material, such as fused quartz, calcium fluoride, zinc selenide, silicon and others may be used to form the optical element.

The optical element is an elongated bar having an entry surface 12 (FIG. 2) against which an incident light wave is directed while the photoelastic modulator is operating. (Other optical element shapes will be acceptable, such as the symmetrical shape depicted in U.S. Pat. No. 3,867,014 to Kemp). A quartz, piezoelectric transducer 20 is bonded to one end of the optical element 10. Electrical leads 22 from the transducer are connected to a driver circuit (not shown) for vibrating the optical element 10. The driver circuit may be tuned to drive the fused-silica element 10 to vibrate at its natural resonant frequency, typically about 50 kHz.

The optical element 10 and transducer 20 (hereafter collectively referred to as the optical assembly 24) are contained within a housing or enclosure 26. The enclosure may be thin-walled sheets of stainless steel defining a channel or tray shape. The enclosure includes an aperture 28 (FIG. 2) through which light is directed to propagate through the vibrating optical element 10. The light that emanates from the element 10 is then detected and analyzed.

Figure 2:
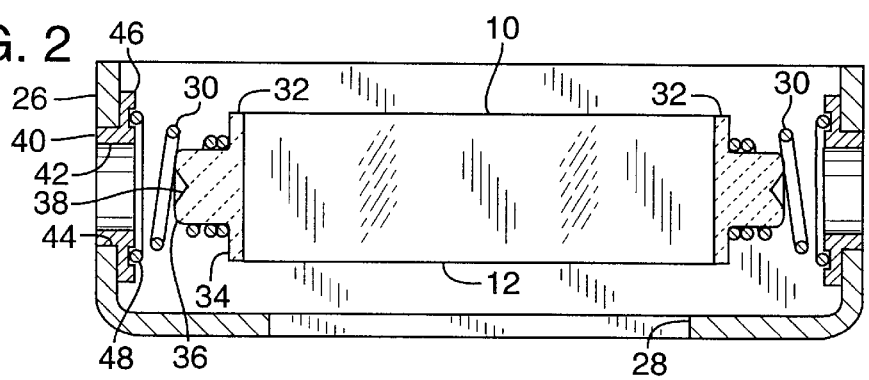
FIG. 2 is a cross-sectional view, taken along line 2—2 of FIG. 3, showing a preferred mounting apparatus in accord with the present invention.

The optical assembly 24 is contained within the enclosure so that it is free to vibrate when driven as described above. In this regard, and in accordance with the present invention, the optical assembly 24 is suspended within the enclosure. As best shown in FIGS. 2 and 3, this mounting technique is preferably accomplished by the use of coiled springs 30 that are fastened between the enclosure 26 and a post 32 that is attached to the long side of the optical assembly 24. As depicted in FIG. 3, four post/spring arrangements are employed: one pair of opposing posts attached to the transducer 20 and another pair of opposing posts attached to the optical element 10. The posts are located at the respective centers of the length of the optical element 10 and transducer 20 where a vibrational node point exists while the assembly is driven.

Figure 5:
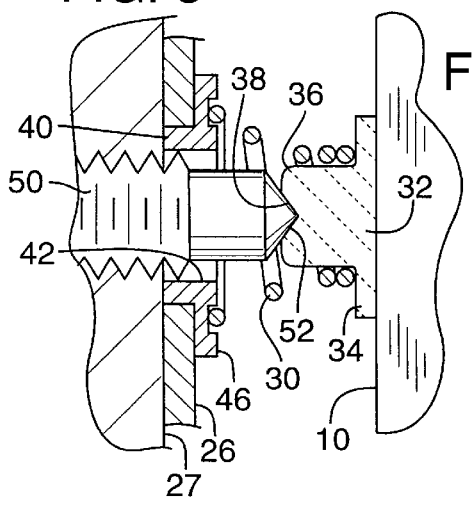
FIG. 5 is an enlarged detailed view of the preferred method of attaching a spring to a post.

With particular attention to FIGS. 2 and 5, each post 32 comprises a unitary piece formed from a machinable ceramic such as "Macor" available from Corning Glass Works of Corning, N.Y. The post includes a thin, cylindrical flange 34 having a diameter corresponding to the thickness (measured in the vertical direction in FIG. 2) of the optical assembly 24. In one preferred embodiment, the flange diameter is 0.25 inches and the flange thickness is 0.02 inches.

The surface of the post flange 34 is bonded to the optical assembly by a bonding agent that does not cause outgassing during high vacuum operations. One such agent is manufactured by Varian Vacuum Products of Lexington, Kentucky, and sold under the name "Torr Seal."

The cylindrical body 36 of the post protrudes outwardly from the flange 34 and has a uniform diameter. A conical recess 38 is formed in the outermost surface of the body 36. The significance of the recess is described more fully below.

The innermost end of the spring 30 wraps tightly around the body 36 of the post. In this regard, the post may include a groove or recess into which fits all or part of the innermost end of the spring. Once attached, the innermost end of the spring does not move relative to post.

The outer end of the spring is seated in a keeper sleeve 40. The keeper sleeve 40 includes a hollow tube portion that fits snugly within a hole 44 formed in the sidewall of the enclosure, concentric with the body 36 of the post 34 when the optical assembly is in place. The keeper sleeve 40 includes a rim 46 that protrudes radially outwardly on one end of the sleeve by an amount greater than the diameter of the hole 44. Thus, the rim 46 rests on the inner surface of the enclosure wall 26, as shown in FIG. 2. An annular recess 48 is formed in the surface of the rim 46 facing the optical element so as to receive the outermost coil of the spring 30. In operation, the spring 30 preferably is maintained in a state of equilibrium. As a result, it is desirable to bond the keeper sleeve 40 to the enclosure 26 and to bond the spring end to the keeper sleeve to ensure that those parts do not move apart. To this end, a small amount of the bonding agent may be employed, such as that manufactured by Varian Vacuum Products of Lexington, Ky., under the designation "Torr Seal."

It is noteworthy that the internal bore 42 of the keeper sleeve 40 defines a clearance opening to facilitate mounting the optical assembly within the enclosure using the springs. More particularly, in a preferred embodiment, the springs on the one side of the assembly (say the left side in FIG. 2) may be temporarily, fully compressed by forcing the optical assembly 24 to the left. The post body 36 is sized to fit through the interior of the spring 30 and through the bore 42 so that the spring on the opposite, right, side of the enclosure can be easily aligned with the post body 36 on that side (since the spring on the right side need not be compressed while fitting it over the post body).

It is also noteworthy that the spring is generally conical or frustum shaped, so that its diameter increases from the inner end to the outer end by an amount such that when the spring is fully compressed, the spring will substantially flatten with the inner, smaller-diameter coils fitting within the outer, larger diameter coils. Thus the spring has a very high compression ratio (free length to compressed length). As a result of the clearance opening 42, and the highly compressible spring, the optical assembly 24 may be easily inserted between opposing pairs of springs, as noted above. For example, once the springs are concentrically aligned with the post bodies on one side of the optical assembly, the optical assembly may be forced against those aligned springs so that the post body 36 protrudes into the bore 42. In such an orientation, the aligned springs are fully compressed and the inner ends can be easily slid over the associated post bodies 36. This is described more below, in connection with FIG. 5.

Another important advantage of the frustum shape of the springs 30 relates to the manner with which the optical assembly is suspended in the enclosure. In particular, the relatively large-diameter outermost end of the spring 30 adjacent the keeper sleeve 40 more effectively provides lateral support of the optical assembly 24 than would otherwise be provided by a uniform-diameter spring. The reaction force at the wide base of the frustum shaped spring resist bending of the spring in supporting the weight of the optical assembly. Thus, to support an optical assembly without sagging, a uniform-diameter spring would need to be correspondingly stiffer than a frustum shaped spring of the same length. As noted above, a design goal of the present mounting apparatus is to suspend the optical element without damping the vibration of the optical assembly. In a present invention, this is in part accomplished by the use of the frustum shaped spring.

Notwithstanding the foregoing, it is contemplated that uniform-diameter coiled springs or substantially straight springs will suffice to support the optical assembly.

In a preferred embodiment, employed with an optical assembly having ¼" thickness, acceptable results were found using a spring formed from 0.016 in. diameter wire of type 302 stainless steel with 4 ½ coils, and a free length of about 0.14 inches and a load rate of about 5.3 lbs/in. As noted earlier, when the optical assembly is mounted to the enclosure, it is desirable to have the spring in a relaxed or equilibrium state.

In the figures, the enclosure 26 and optical assembly 24 are shown in a generally horizontal orientation. It is pointed out, however, that these components of a photoelastic modulator can be used in any orientation. For example, with reference to FIG. 2, the photoelastic modulator components could be rotated, clockwise or counterclockwise, 90 degrees from the orientation of FIG. 2 so that the modulator operates in a generally vertical orientation, with one long side above the other. As noted above, the inner ends of the springs 30, which surround the body 36 of the post members, are tightly wrapped around those bodies 36. As a result, whenever the photoelastic modulator is used in a vertical orientation as just mentioned, the springs above the optical assembly will support part of the weight of the optical assembly 24 so that the weight is substantially uniformly distributed over the springs above and below the assembly. Consequently, there would be no undesirable stress induced in the optical element 10, which might be the case if the weight of the optical assembly were permitted to shift to the lower springs as an optical assembly is moved to a vertical orientation. Moreover, this weight distribution ensures that the Q value of the system does not diminish when the assembly is operated in the vertical orientation.

It is contemplated that in instances where the photoelastic modulator is to be retained in only the vertical orientation, the entire optical assembly 24 may be supported solely by suspending or hanging the assembly from springs oriented above the assembly. This would eliminate the need for lower springs and would, thus, likely improve the system's "Q" value. For example, another orientation that may be characterized as vertical results when the optical assembly 24 is positioned such that the transducer 20 is above the optical element 10. In this arrangement, two springs may be attached between a short end of the transducer (the short end opposite the end to which the optical element is bonded) and the enclosure. Other springs would not be required. The optical element, therefore, would hang substantially free, attached to the enclosure only through the connection with the transducer. Consequently, the Q value of the system would be relatively high.

FIG. 4 represents both an alternative embodiment and a fixture that may be used for attaching the springs 30 to their respective posts 32 of an optical assembly. Turning first to the fixture aspect of this embodiment, and with particular reference to the detail of FIG. 5, the alternative embodiment includes a relatively thick-walled, tray shaped enclosure 27 through which are threaded four fasteners 50. The fasteners are manually rotatable to extend and retract toward and away from the optical assembly 24 that is positioned within the enclosure. In a preferred embodiment, the fasteners include conical tips 52 that correspond in shape to the recesses 38 formed in the posts 32 that are carried on the optical assembly as described above.

When the embodiment of FIG. 4 is used as a fixture, the enclosure 26 of the prior discussed embodiment is fit between the walls 27 of the fixture enclosure (see FIG. 5) so that the fasteners 50 are aligned with the clearance openings 42 in the keeper sleeves that are attached to the sidewalls of the enclosure 26. As shown in the detail of FIG. 5, the fastener 50 is threaded to engage the post 32 with the spring 30 surrounding the end of the fastener. Inasmuch as the inner end of the spring 30 is slightly smaller in diameter than that of the body 36 of the post, it is necessary to force the inner end of the spring over the post. This is done while the tip 52 of the fastener engages the recess 38 in the post body 36. Thus, the inner end of the spring may then be pulled (as by a pointed probe) so that it slides over the body 36 against the flange 34 of the post as shown in FIG. 5. As described above, the spring may be fully compressed (by retracting fasteners on one side of the assembly and extending fasteners on the other side) during the time the inner ends of the spring are slid over the post bodies.

As noted above, it is contemplated that the embodiment of FIG. 4 may be used as an alternative apparatus for suspending the optical assembly 24. In this regard, no springs 30 or separate enclosure 26 are employed. Instead, the tips 52 of the fasteners 50 remain in engagement with the recesses 38 formed in the body 36 of each post 32. The fasteners are manually adjusted so that the fasteners engage but do not compress the optical element while the assembly is suspended between the walls of the enclosure 27. Residual strain detection may be employed to ensure that no strain is induced by the contact between the fasteners 50 and the posts 32.

Figure 6:
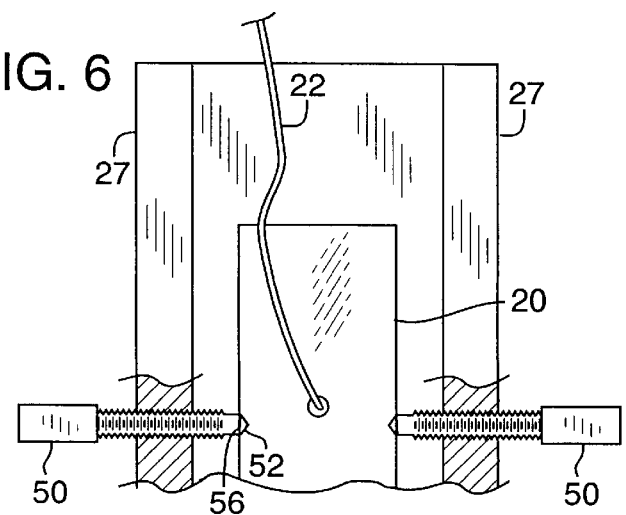
FIG. 6 is a partial top view of an alternative mounting apparatus in accordance with the present invention.

In the embodiment of FIG. 6, there is depicted a variation of the alternative of FIG. 4 whereby no posts 32 are employed. Instead, conical shaped recesses 56, which conform to the shapes of the fastener tips 52, are formed in the optical assembly itself. Although only the transducer 20 is depicted in FIG. 6, it will be appreciated that both the transducer and the optical element 10 are similarly supported. In this embodiment, the elimination of the need for bonding a post 32 to the optical assembly tends to increase the "Q" value of the overall system.

In instances where the PEM is not used in a high vacuum environment, other mounting techniques may be employed to improve the Q value of the system and to simplify the process of mounting the optical assembly to the enclosure of the PEM. For example, with reference to FIG. 7, the optical assembly 124 may be supported by an array of mounts 132 that each comprise a single-piece, somewhat flexible member connected directly to the assembly 124 and extending therefrom into engagement with the enclosure of the PEM. Such an arrangement eliminates the need for fastening the prior art cone-shaped supports to the assembly. Those somewhat rigid, cone-shaped supports tend to induce greater damping in the vibrating optical assembly as compared to the more flexible, single-piece mounts 132. Thus, the use of such mounts increase the "Q" value of the system as compared to the prior supports.

The mounts (FIGS. 7 and 8) are made from a molded thermoplastic. A mount 132 includes a base 134 that is generally rectangular when viewed from the front (FIG. 8). The base 134 has a flat bottom 135 and top 137. The sides 138 of the base 134 are rounded as viewed from above (FIG. 8). An integrally formed body portion 136 protrudes from the base 134 and terminates at a location where the body portion abuts (without compression or extension) the optical assembly 124. In a preferred embodiment, the body portion is cylindrically shaped. At the junction of the body portion 136 and the base 134, the base is narrowed somewhat to define a shoulder 139 that tends to stiffen the body in the vicinity of the enclosure 126, thereby enhancing the lateral support provided by the mounts to the assembly.

The flat, innermost end of the body 136 (that is, the end away from the base 134) is bonded to the optical element with a suitable adhesive, such as the RTV silicon sealant from Dow Corning.

With the mounts bonded to the assembly 124, the bases 134 of the mounts are slid into correspondingly shaped recesses or pockets 140 formed in the wall of the enclosure 126. The pockets are formed in the wall to include a slot that opens through the inner surface of the enclosure and through which slot part of the shoulder 139 of the base protrudes.

It is contemplated that the array of mounts described with respect to FIGS. 7 and 8 may be formed as a single member, such as by injection molding. In this regard, reference is made to FIG. 9 which shows, in a plan view, an integrated mounting member 232 carried within a recess or groove formed in the wall of a PEM enclosure 226 and having body portions 236 that extend from the enclosure to contact and support the optical assembly 224.

As noted, the mounting member 232 could be injection molded as a single member, with the distances between the innermost ends of each protruding body portion precisely matching the width of an optical assembly 224. As was the case of the embodiment of FIGS. 7 and 8, the flat innermost ends of the body portions 236 are bonded to the optical assembly 224 with a suitable adhesive. Alternatively, the entire optical assembly 224 could be included in the injection molding process so that the ends of the body portions 236 flow into contact with the optical assembly and bond directly thereto in the absence of any adhesives.

Although cylindrical body portions 236 are depicted in FIG. 9, other shapes will suffice. Moreover, the junctions between the body portions 236 and the remainder of the mounting member can be formed with shoulders, as described above in connection with FIGS. 7 and 8, but not shown in FIG. 9.

It will be appreciated that once the optical assembly 224 is completely bonded to the integrated mounting member 232, the mounting of the optical assembly to the enclosure is simple. The integrated mounting member 232 (with optical assembly attached) is slid into the correspondingly shaped groove 235 that is formed in the wall of the enclosure 226.

Having described the principles of our invention with reference to several preferred embodiments and variations thereon, it should be apparent that the invention can be modified in arrangement and detail without departing from such principles.

For example, the fasteners shown in FIG. 6 may be replaced with coiled springs like those in FIG. 2 except modified so that the inner end of each spring is straightened to fit into a correspondingly sized hole that is formed in the assembly at a location where (and instead of) the recesses 56 appear in FIG. 6. The spring end would be bonded, as with "Torr Seal," within the hole to provide flexible, cushioned mounting. It will be appreciated that such springs could also be arranged to support the PEM in the vertical orientations described above.

Alternatively, the fasteners of FIG. 5 may be replaced with threaded fasteners that carry on their tips spring-loaded ball bearings or plungers that would seat in the recesses 56. Such devices are available from Main Tool Supply, of Thornwood, N.Y., in various configurations under the brand name "Vlier."

Accordingly, it should be recognized that the foregoing embodiments are illustrative only and should not be taken as limiting the scope of the invention. Instead, what is claimed as the invention is all such modifications as may come within the scope and spirit of the following claims and equivalents thereto:

1. A photoelastic modulator, comprising:

an enclosure;

an optical assembly comprising an optical element and a transducer attached to the optical element and operable for vibrating the optical element; and suspension means extending between the enclosure and optical assembly for suspending, in the absence of elastomeric material, the optical assembly within the enclosure for permitting vibration of the optical element, whereby the modulator is adapted for use in a high vacuum environment.

2. The modulator of claim 1 wherein the suspension means includes at least two springs having respective first and second ends, the first ends fastened to the enclosure and the second ends fastened to the optical assembly.

3. The modulator of claim 2 wherein the springs are coiled and have diameters that vary between the first and second ends.

4. The modulator of claim 2 wherein the suspension means further includes at least two post members fastened to the optical element, to each of which post members the second end of one spring engages the post member in a manner such that the springs support the weight of the optical assembly irrespective of the orientation of the optical assembly.

5. The modulator of claim 4 wherein the second ends of the springs are connected to the respective post members in a manner to restrict movement of the second spring end relative to the post member.

6. The modulator of claim 5 wherein the diameter of the spring at the first end is greater than the diameter of the spring at the second end.

7. The modulator of claim 4 wherein the post members have outer surfaces, and into which surfaces are formed recesses.

8. The modulator of claim 4 including a mounting member that is attached to the first end of each spring and to the enclosure, the mounting member including an aperture into which may protrude part of the post member that is engaged by the second end of the spring.

9. The modulator of claim 8 wherein the mounting member is stainless steel.

10. The modulator of claim 2 wherein the springs are stainless steel.

11. The modulator of claim 1 wherein the suspension means includes threaded members mounted to the enclosure and adjustable for extension into contact with the optical assembly.

12. The modulator of claim 11 wherein the threaded members have tapered tips that fit into correspondingly tapered recesses on the optical assembly.

13. The modulator of claim 12 further comprising post members carried by the optical assembly, the post members having the correspondingly tapered recesses formed therein.

14. The modulator of claim 12 wherein the correspondingly tapered recesses are formed in the optical assembly.

15. The modulator of claim 1 wherein the optical assembly includes opposing long sides and relatively shorter opposing ends, and wherein the suspension means includes springs for suspending the optical assembly with one long side above the other.

16. The modulator of claim 1 wherein the optical assembly includes opposing long sides and relatively shorter opposing ends, and wherein the suspension means includes springs for suspending the optical assembly with one end above the other.

17. The modulator of claim 16 wherein the suspension means comprises springs attached to the transducer so that the optical element is not connected by springs to the enclosure.

18. A photoelastic modulator, comprising:
   an enclosure;
   an optical assembly comprising an optical element, and a transducer attached to the optical element and operable for vibrating the optical element; and
   springs connected between the optical assembly and the enclosure for suspending the optical assembly within the enclosure in a manner to permit vibration of the optical element within the enclosure.

19. The modulator of claim 18 including post members mounted on the optical assembly and arranged so that each post member attaches to the end of one spring.

20. The modulator of claim 19 wherein the springs are coiled and each coiled spring has a diameter that varies from one spring end to the other spring end.

21. The modulator of claim 18 wherein the springs include ends that fit into correspondingly shaped holes formed in the assembly, the spring ends being bonded in those holes.

22. A method of mounting an optical assembly of a photoelastic modulator comprising an optical element and a transducer to a rigid enclosure, comprising:
   suspending the optical assembly in the enclosure with metallic members that permit vibration of the optical element relative to the enclosure including attaching coiled springs between posts carried on the optical assembly and the enclosure.

23. The method of claim 22 including the step of providing clearance openings in the enclosure for receiving the posts, thereby to facilitate attachment of the posts to the springs.

24. A photoelastic modulator comprising:
   an enclosure;
   an optical assembly comprising an optical element and a transducer attached to the optical element and operable for vibrating the optical element;
   an array of mounting members connected between the optical assembly and the enclosure for suspending the optical assembly within the enclosure in a manner to permit vibration of the optical element within the enclosure;
   wherein portions of the mounting members are flexible and connected to the optical assembly and contact the enclosure, these potions being formed of a single piece and movable relative to the enclosure.

25. The modulator of claim 24 wherein the portions of the mounting members are integrally formed with the mounting member to comprise a single piece.

26. The modulator of claim 24 wherein the enclosure includes walls in which recesses are formed to receive part of the mounting member portions.

27. The modulator of claim 25 wherein the portions of the mounting member are molded to the optical assembly.

* * * * *